United States Patent
Arnault et al.

(10) Patent No.: US 9,797,448 B2
(45) Date of Patent: Oct. 24, 2017

(54) BEARING HAVING AN OVERMOULDED WEAR RACE, AND ASSOCIATED MANUFACTURING METHOD

(71) Applicants: Benoit Arnault, Saint-Cyr-sur-Loire (FR); Philippe Walter, Fondettes (FR)

(72) Inventors: Benoit Arnault, Saint-Cyr-sur-Loire (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/076,720

(22) Filed: Mar. 22, 2016

(65) Prior Publication Data

US 2016/0281783 A1  Sep. 29, 2016

(30) Foreign Application Priority Data

Mar. 24, 2015 (FR) ...................... 15 52436

(51) Int. Cl.
*F16C 33/58* (2006.01)
*F16C 33/64* (2006.01)
*F16D 23/14* (2006.01)

(52) U.S. Cl.
CPC .......... *F16C 33/586* (2013.01); *F16C 33/585* (2013.01); *F16C 33/64* (2013.01); *F16D 23/143* (2013.01); *F16C 2208/60* (2013.01); *F16C 2220/04* (2013.01); *F16C 2361/43* (2013.01); *F16D 23/14* (2013.01)

(58) Field of Classification Search
CPC ...... F16C 33/585; F16C 33/586; F16C 33/64; F16C 2220/04; F16C 2361/43; F16C 2208/60; F16D 23/143; F16D 23/146; B21D 22/14; B21D 37/18; B21D 26/021
USPC ........ 384/495, 505, 513, 537, 611–612, 615, 384/617, 490
See application file for complete search history.

(56) References Cited

U.S. PATENT DOCUMENTS

| | | | | |
|---|---|---|---|---|
| 2,169,315 A | * | 8/1939 | Yngve | B29C 57/00 156/221 |
| 4,033,440 A | * | 7/1977 | Ladin | F16D 23/146 192/98 |
| 4,056,291 A | * | 11/1977 | Kraft | B21D 22/16 384/537 |
| 4,229,058 A | * | 10/1980 | Arrowsmith | F16D 23/14 192/110 B |
| 4,969,755 A | * | 11/1990 | Parzefall | F16D 23/14 192/110 B |

(Continued)

FOREIGN PATENT DOCUMENTS

| | | | | |
|---|---|---|---|---|
| DE | GB-2338766 A | * | 12/1999 | ............. F16D 23/14 |
| DE | 10125691 A1 | | 7/2002 | |

(Continued)

*Primary Examiner* — Marcus Charles
(74) *Attorney, Agent, or Firm* — Bryan Peckjian; SKF USA Inc. Patent Dept.

(57) ABSTRACT

The bearing provides an inner race, an outer race and a wear race that is made of synthetic material and fastened to one of the races. The wear race is overmolded on at least one face of the race. The face includes at least one retention means that is covered with the synthetic material of the wear race and shaped to allow both the axial retention and the angular retention of the wear race relative to the race by shape complementarity with the wear race.

8 Claims, 2 Drawing Sheets

(56) References Cited

U.S. PATENT DOCUMENTS

| | | | | |
|---|---|---|---|---|
| 5,619,879 A | * | 4/1997 | Friese | B21D 22/16 29/894.362 |
| 6,684,996 B2 | * | 2/2004 | Winkelmann | F16D 23/14 192/110 B |
| 6,719,117 B2 | * | 4/2004 | Klopfer | F16D 23/146 192/110 B |
| 6,843,354 B2 | * | 1/2005 | Dittmer | F16C 23/084 192/110 B |
| 8,534,926 B2 | * | 9/2013 | Suzuki | F16C 19/163 192/98 |
| 2002/0097940 A1 | * | 7/2002 | Arnault | F16C 25/083 384/612 |
| 2002/0134640 A1 | * | 9/2002 | Klopfer | F16D 23/143 192/98 |
| 2006/0081439 A1 | * | 4/2006 | Winkelmann | F16D 23/14 192/98 |
| 2008/0210515 A1 | | 9/2008 | Winkelmann | |
| 2011/0016960 A1 | * | 1/2011 | Debrailly | B62D 15/0235 73/115.07 |
| 2013/0001038 A1 | * | 1/2013 | Arnault | F16D 23/146 192/110 B |

FOREIGN PATENT DOCUMENTS

| | | | | |
|---|---|---|---|---|
| DE | 102004034439 A1 | | 2/2006 | |
| FR | 2883347 A1 | * | 9/2006 | F16D 23/14 |
| FR | 2883347 A1 | | 9/2006 | |
| FR | 2922285 A1 | * | 4/2009 | F16D 23/146 |
| GB | 2072770 A | * | 10/1981 | F16D 23/143 |
| JP | 2012192414 A | * | 10/2012 | B21D 22/16 |
| JP | WO-2015118795 A1 | * | 8/2015 | B21D 22/14 |
| WO | 2012153161 A1 | | 11/2012 | |

\* cited by examiner

BEARING HAVING AN OVERMOULDED WEAR RACE, AND ASSOCIATED MANUFACTURING METHOD

CROSS-REFERENCE TO RELATED APPLICATIONS

This is a Non-Provisional Patent Application, filed under the Paris Convention, claiming the benefit of French (FR) Patent Application Number 1552436, filed on 24 Mar. 2015, which is incorporated herein by reference in its entirety.

FIELD OF THE INVENTION

The present invention relates to the field of bearings, notably that of rolling bearings used in clutch release bearing devices intended to act on the diaphragm of a clutch, in particular for a motor vehicle.

BACKGROUND OF THE INVENTION

Such devices provide a rolling bearing, one of the races of which turns and the other of which is fixed, the turning race being provided with a radial leading surface intended to come into contact with the end of the fingers of the diaphragm of the clutch.

A non-turning operating element supports the rolling bearing and, when acted on by a (mechanical, electrical or hydraulic) control element, moves the bearing axially so as to cause the leading surface of the turning race to press against the diaphragm of the clutch and to actuate the clutch mechanism.

In order to limit friction wear between the fingers of the diaphragm and the turning race during clutch engagement and release operations, it is possible to fasten a wear race made of polymeric material to the turning race. For more details relating to such a wear race, reference may be made for example to patent application FR-A1-2 883 347.

In the bearing described in this earlier document, a plate crimped onto the turning race is provided to ensure retention of the wear race on the race. However, this solution has the drawback of increasing the number of components of the bearing to be manufactured, stored and assembled.

BRIEF SUMMARY OF THE INVENTION

The present invention aims to remedy this drawback.

More specifically, the present invention aims to provide a bearing for a clutch release bearing device that involves a number of components that is smaller and easy to manufacture.

The present invention also aims to provide a bearing that exhibits good operational reliability.

In one embodiment, the bearing provides an inner race, an outer race and a wear race that is made of synthetic material and fastened to one of the races. The wear race is overmoulded on at least one face of the race. The face of the race provides at least one retention means that is covered with the synthetic material of the wear race and shaped so as to allow both the axial retention and the angular retention of the wear race relative to the race by shape complementarity with the wear race.

The overmoulding of the wear race on the race ensures that these two races are secured together properly. Moreover, the one or more retention means of the face of the race ensure that the wear race is retained axially and angularly relative to the race. Each retention means thus has a double function of retention or coupling in the axial direction and in the circumferential direction. The risk of axial and rotational detachment of the wear race from the race is limited.

Preferably, the retention means provides two opposite side edges for the angular retention of the wear race and at least one front face for the axial retention of the wear race, the side edges and the front face being covered by the synthetic material of the wear race.

The retention means may be obtained by local deformation of the material of the race. The retention means may be formed on the face of the race, being produced in one piece with the race.

In one embodiment, the retention means provides a rib that protrudes with respect to the face of the race and is embedded in the synthetic material of the wear race. The rib may protrude radially with respect to the face of the race.

In one embodiment, the retention means is provided on an axial portion of the race.

In one embodiment, the retention means is provided on an external face of the race.

The face of the race may also provide at least one blind indentation which extends from the retention means and into which the synthetic material of the wear race passes. Preferably, the indentation provides two side edges covered with the synthetic material of the wear race.

The face of the race may also provide an annular groove, from the bottom of which the retention means extends and into which the synthetic material of the wear race passes.

The bearing may provide at least one row of rolling elements disposed between the races.

The invention also relates to an assembly comprising a bearing as defined above and an operating element supporting the bearing. The assembly may be a clutch release bearing device. The assembly may also be a motor vehicle comprising the clutch release bearing device.

The invention also relates to a method for manufacturing a bearing of the type comprising an inner race and an outer race, wherein a wear race is fastened to one of the races. At least one retention means is formed locally on a face of the race by local spinning of material. The wear race is overmoulded at least on the face of the race so as to entirely cover the retention means.

BRIEF DESCRIPTION OF THE DRAWINGS

The present invention will be better understood from reading the detailed description of an embodiment which is given by way of entirely non-limiting example and is illustrated by the appended drawings, in which.

DETAILED DESCRIPTION OF THE INVENTION

Figure 1:
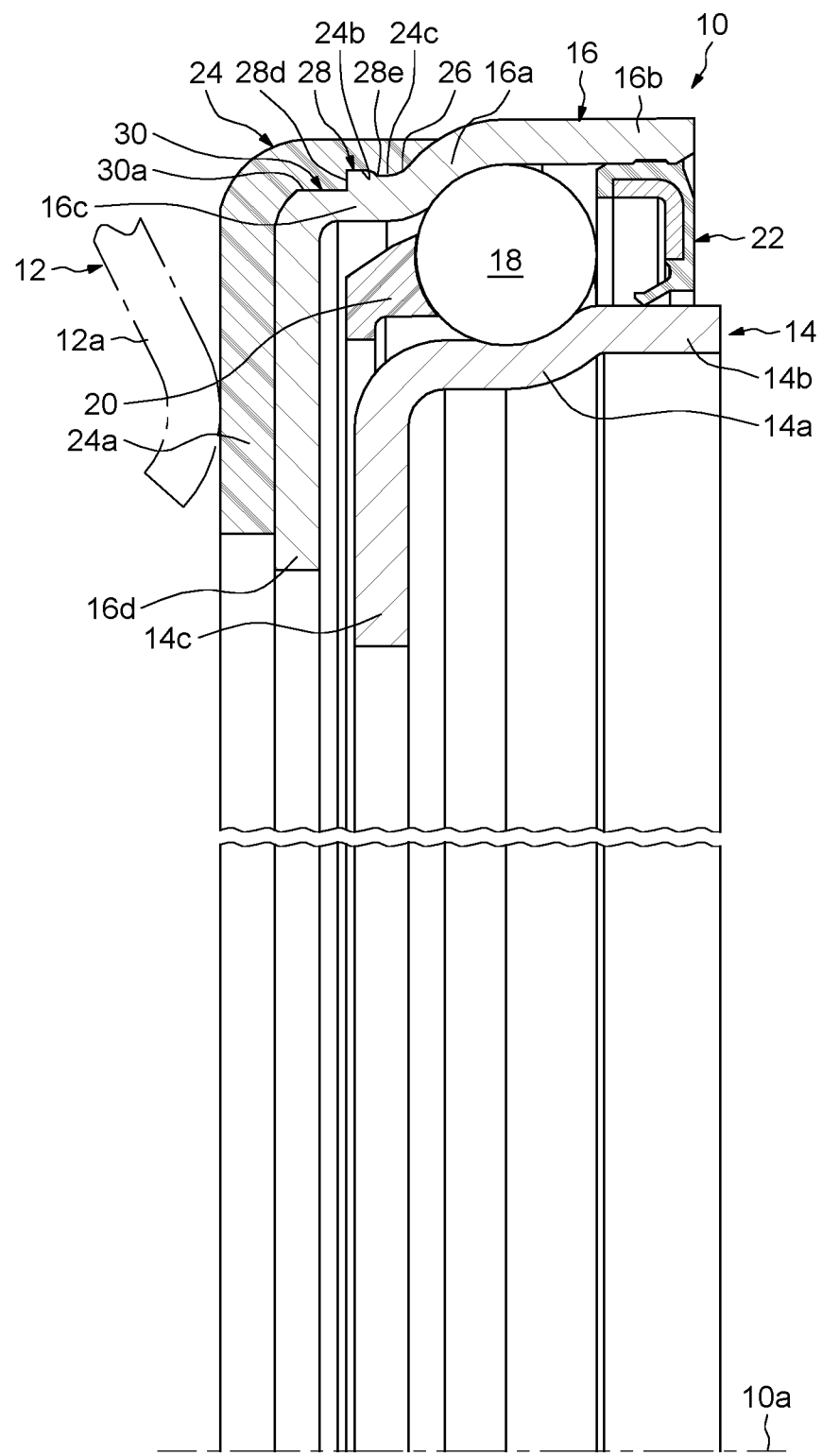
FIG. 1 is a half-view in axial section of a rolling bearing according to an exemplary embodiment of the invention.

In FIG. 1, a rolling bearing, with the overall reference 10, is intended to be used in a clutch release bearing device provided to act on the diaphragm 12 of a clutch, in particular for a motor vehicle. In the figure, the diaphragm 12 is illustrated in part and shown in broken lines. The diaphragm 12 provides a plurality of fingers 12a spaced apart in the circumferential direction. The rolling bearing 10 is intended to be mounted on an operating element (not shown) of the associated clutch release bearing device and is provided so as to be moved axially.

The rolling bearing 10, of axis 10a, provides a non-turning inner race 14, a turning outer race 16, a row of rolling elements 18 that are produced, here, in the form of balls and are disposed radially between the raceways provided on the races, a cage 20 for maintaining the regular circumferential spacing of the rolling elements 18, and an annular seal 22 fastened to the outer race. A rolling space (not referenced) is delimited radially between the inner race 14 and outer race 16. Inside the rolling space, the rolling elements 18 and the associated maintaining cage 20 are housed.

As will be described in greater detail below, the bearing 10 further provides a wear race 24 overmoulded on the outer race 16 and provided to come axially into contact with the diaphragm 12 of the clutch.

The thin-walled inner race 14, of axis 10a, may advantageously be made by pressing a plate made, for example, of steel. The inner race 14 is made in one piece. The inner race 14 provides a toroidal portion 14a having in cross section a quarter-circle concave internal profile that forms the track or raceway of the race for the rolling elements 18. The inner race 14 also provides an annular axial portion 14b that extends a large-diameter edge of the toroidal portion 14a axially away from the outer race 16. The inner race 14 also provides an annular radial portion 14c that extends a small-diameter edge of the toroidal portion 14a and extends radially inwards. The radial portion 14c is situated axially away from the axial portion 14b with respect to the toroidal portion 14a.

The thin-walled outer race 16, of axis 10a, can also be advantageously made by pressing a plate made, for example, of steel. The outer race 16 is made in one piece. The outer race 16 provides a toroidal portion 16a having in cross section a quarter-circle concave internal profile that forms the track or raceway of the race for the rolling elements 18. The toroidal portion 16a is extended at either end by annular axial portions 16b, 16c. The axial portion 16b extends a large-diameter edge of the toroidal portion 16a and radially surrounds the toroidal portion 14a of the inner race. The axial portion 16c extends a small-diameter edge of the toroidal portion 16a axially away from the axial portion 16b. The outer race 16 also provides an annular radial portion 16d that extends the axial portion 16c radially inwards.

The outer race 16 provides an external face 26 which is oriented towards the outside of the bearing, i.e. on the side opposite the rolling elements 18, and against which the wear race 24 is mounted so as to bear. The external face 26 is formed by the outer surface of the portions 16a to 16c of the outer race and the front surface of the radial portion 16d which is oriented on the same side as the diaphragm 12.

The outer race 16 provides a plurality of ribs 28 that are provided on the axial portion 16c and extend outwards. The ribs 28 extend radially outwards with respect to the outer surface of the axial portion 16c. The ribs 28 are spaced apart from one another in the circumferential direction, preferably in a regular manner. The ribs 28 are identical to one another. There can be, for example, four of the ribs 28. In a variant, it is possible to provide a different number of ribs, for example one, two or three or even five or more.

Figure 2:
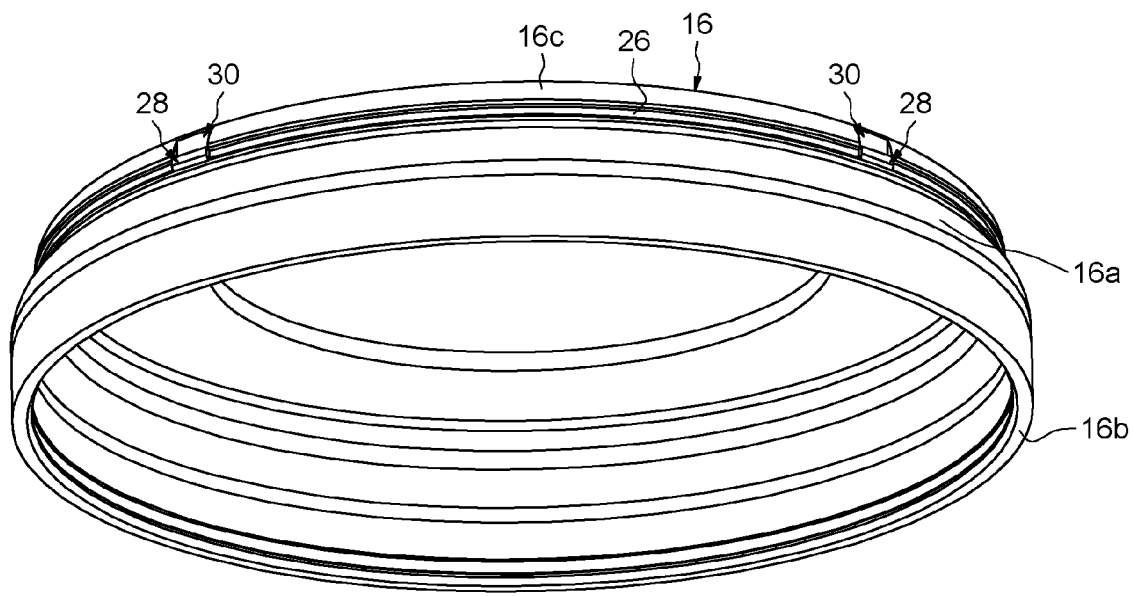
FIG. 2 is a perspective view of an outer race of the bearing from FIG. 1.
Figure 3:
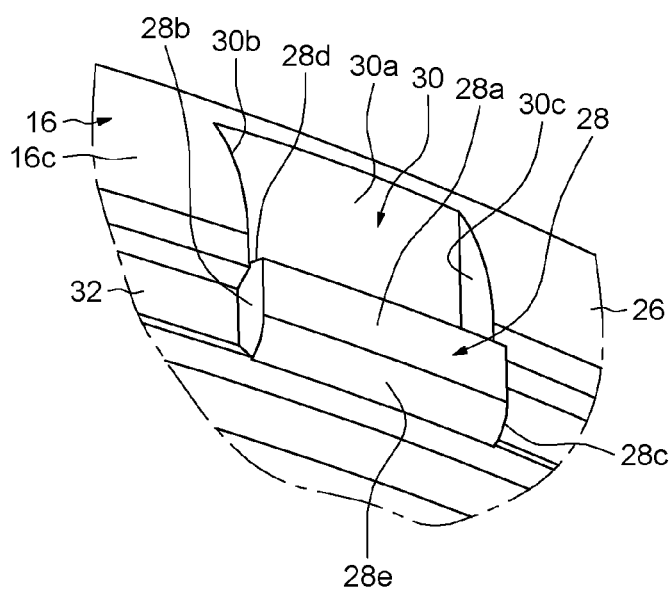
FIG. 3 is a detail view of FIG. 2.

As illustrated more clearly in FIGS. 2 and 3, each rib 28 locally forms a protuberance that extends radially with respect to the external face 26 of the outer race, and more specifically with respect to the outer surface of the axial portion 16c. The ribs 28 are produced integrally with the outer race 16, i.e. in one piece. Each rib 28 provides an external surface 28a that is offset radially towards the outside with respect to the outer surface of the axial portion 16c, and two opposite side edges 28b, 28c that delimit the external surface and the rib in the circumferential direction. The side edges 28b, 28c protrude with respect to the outer surface of the axial portion 16c. Each rib 28 extends through a limited angular sector, for example between 5° and 10°.

Each rib 28 also provides two opposite front faces 28d, 28e that delimit the external surface 28a and the rib in the axial direction. The front faces 28d, 28e delimit the axial thickness of the rib 28. The front faces 28d, 28e protrude with respect to the outer surface of the axial portion 16c. The front face 28d forms a forward face of the rib and the front face 28e forms a rear face of the rib. The "forward face" is understood here to mean that face of the rib 28 that is oriented axially on the outer side of the bearing, i.e. on the side of the diaphragm 12, and "rear face" is understood to mean that face of the rib that is axially away from the forward face.

The outer race 16 also provides a plurality of blind indentations 30 that are provided on the axial portion 16c and each extend axially outwards from one of the ribs 28. The indentations 30 are identical to one another. As will be described in more detail below, each indentation 30 and the associated rib 28 are obtained during an operation of local spinning of the material of the outer race 16.

Each indentation 30 extends axially outwards from the forward front face 28d of the associated rib. Each indentation 30 extends radially from the external face 26 of the outer race, and more specifically from the outer surface of the axial portion 16c. Each indentation 30 extends radially through the thickness of the outer race without opening onto an internal face of the race away from the external face. Each indentation 30 provides an end wall 30a that is offset radially towards the inside with respect to the external face 26 of the outer race, and two opposite side edges 30b, 30c that delimit the end wall and the indentation in the circumferential direction. The side edges 30b, 30c connect the end wall 30a to the external face 26. The side edges 30b, 30c are set back with respect to the external face 26. The side edges 30b, 30c of each indentation axially extend the respective side edges 28b, 28c of the associated rib.

In the exemplary embodiment illustrated, the outer race 16 also provides an annular groove 32 provided in the axial portion 16c and directed radially outwards. The ribs 28 extend radially outwards from an end wall (not referenced) of the groove 32. In a variant, it may be possible for the outer race 16 not to have such a groove.

Referring again to FIG. 1, the seal 22 is fastened to the outer race 16 and forms a dynamic seal with the inner race 14. A "dynamic seal" is understood to mean a seal between two parts in relative motion. The seal 22 is fastened in this case in the bore of the axial portion 16b of the outer race and rubs against the outer surface of the axial portion 14b of the inner race.

The wear race 24 is provided to interact by contact with the diaphragm 12. The wear race 24 is produced in one piece. The wear race 24 is made of a synthetic material. By way of illustration, the wear race 24 can be made for example of unfilled polyamide or polyamide filled with mineral fibres or carbon.

The wear race 24 provides an annular body 24a mounted so as to bear against the external face 26 of the outer race 16. The body 24a partially covers the external face 26. In the exemplary embodiment illustrated, the body 24a covers the radial portion 16d, the axial portion 16c and the toroidal portion 16*a* of the outer race on the outer side of the bearing. The body 24*a* entirely covers the ribs 28. The body 24*a* delimits a front leading or pressing surface provided to interact axially by contact with the fingers 12*a* of the diaphragm. The diaphragm 12 comes to bear against the body 24*a* of the wear race axially on the side opposite the outer race 16.

As indicated above, the wear race 24 is overmoulded on the outer race 16. This results in excellent securing of these two parts, this also being reinforced by virtue of the ribs 28 of the outer ring, which are covered with the synthetic material of the wear race 24. During overmoulding, a plurality of slots 24*b* having shape complementarity with the ribs 28 are formed in the bore of the wear race 24. Each rib 28 fits into the associated complementary slot 24*b*. The side edges 28*b*, 28*c* of each rib are covered with the synthetic material of the wear race 24 during overmoulding. The side edges 28*b*, 28*c* of each rib ensure the angular retention of the wear race 24 with respect to the outer race 16. The side edges 28*b*, 28*c* of each rib form edges for immobilizing the wear race 24 or preventing it from rotating. Each rib 28 is embedded in the synthetic material of the wear race 24.

Moreover, during overmoulding, the synthetic material of the wear race passes into the indentations 30 in the outer race and forms a plurality of protuberances (not referenced) by shape complementarity in the bore of the wear race 24. The side edges 30*b*, 30*c* of each indentation that are covered with the synthetic material of the wear race 24 also help to prevent the wear race from rotating.

Furthermore, the rear front face 28*e* of each rib that is likewise covered with the synthetic material of the wear race 24 ensures that the wear race is retained axially on the outer race 16. During the overmoulding of the wear race 24, an annular lip 24*c* is formed in the bore of the race. The lip 24*c* covers the front face 28*e* of each rib and protrudes radially inwards with respect to the external surface 28*a* of the rib. The axial retention of the wear race 24 on the outer race 16 is ensured by shape complementarity between the annular coupling lip 24*c* of the wear race and the ribs 28 of the outer race. The front face 28*e* of each rib prevents the wear race 24 from being extracted relative to the outer race 16. The groove 32 in the outer race that is filled with the synthetic material of the wear race 24 also helps to axially retain the wear race.

In order to produce the assembly of the wear race 24 on the outer race 16, the procedure is as follows. First of all, the ribs 28 are formed on the outer race 16. The ribs 28 are formed by axial spinning of material without removing chips so as to locally bring about a flow of material radially outwards. The ribs 28 are obtained by local plastic deformations of the external face 26 of the outer race. In the exemplary embodiment illustrated, the ribs 28 are obtained by local deformations of the axial portion 16*c* of the outer race. The indentations 30 are formed during this step of axial spinning of material. The ribs 28 and the indentations 30 are preferably formed during pressing operations provided to produce the outer race 16. Next, during a subsequent step, the wear race 24 is overmoulded on the outer race 16 so as to partially cover the external face 26 of the race and to cover the ribs 28, the indentations 30 and the groove 32, as indicated above.

In the exemplary embodiment illustrated, the ribs 28 are formed by axial spinning of material. In a variant, the ribs 28 can be formed by radial spinning of material, for example by indenting the axial portion 16*c* of the outer race from the inside to the outside. In another embodiment, it may be possible to provide local deformations of the radial portion 16*d* of the outer race by axial spinning so as to likewise form ribs that extend radially outwards on the axial portion 16*c* of the race. In these two latter embodiments, the outer race 16 does not have indentations 30.

In the exemplary embodiment illustrated, the means for retaining the wear race 24 on the outer race are in the form of ribs 28 that protrude with respect to the external face 26 of the outer race. Alternatively or in combination, the retention means may provide through-slots or blind slots formed in the external face 26, it being possible for the slots each to be provided with two opposite side edges that delimit the slot in the circumferential direction, and two opposite, forward and rear, front faces that delimit the slot in the axial direction. In this case, during the overmoulding of the wear race, a plurality of ribs are formed in the bore of the wear race, the ribs each fitting in the associated slot in the outer race. The forward front face of each slot ensures the axial retention of the wear race on the outer race and the side edges ensure the angular retention on the race. The slots can be obtained by local spinning of material of the outer race in the radial direction.

In the exemplary embodiments described, the means for retaining the wear race 24 on the outer race are provided on the external face of the outer race. In a variant, it may be possible to provide the means for retaining the wear race on the internal face of the outer race.

In the exemplary embodiments described, the outer race provides a plurality of retention means that interact with the wear race. In a variant, the outer race may provide a single retention means.

The invention has been illustrated on the basis of a rolling bearing in which the wear race is overmoulded on the outer race. In a variant, the wear race can be overmoulded on the inner race when the inner race is provided so as to turn. The invention has been illustrated on the basis of a rolling bearing provided with a first race, a second race and at least one row of rolling elements disposed between the races. In a variant, the bearing could be a plain bearing or a swivel.

The invention claimed is:

1. A method of manufacturing a bearing comprising:
   providing an inner race,
   providing an outer race comprising an internal face oriented towards an inside of the bearing and an external face oriented towards an outside of the bearing, the internal face and the external face delimiting a thickness of the outer race, the outer race further comprising a radial portion and an axial portion each forming a portion of the external face and the internal face of the outer race, wherein the axial portion extends axially from a radially outer end of the radial portion, and
   overmoulding a wear race that is made of synthetic material to the external face of the outer race such that adjacent portions of the radial portion and the axial portion of the external race, and any surface area therebetween, are completely covered by the wear race so that the wear race non-detachably engages the outer race, the overmoulding of the wear race onto the external face of the outer race resulting in there being no spacing therebetween, wherein the wear race is overmoulded over the outer race, on at least one face of the race, the face providing at least one retention means that is covered with the synthetic material of the wear race and shaped to allow both an axial retention and an angular retention of the wear race relative to the race by shape complementarity with the wear race.

2. The method according to claim 1, wherein the retention means includes two opposite side edges for the angular retention of the wear race and at least one front face for the axial retention of the wear race, the side edges and the front face being covered by the synthetic material of the wear race.

3. The method according to claim 1, wherein the retention means is obtained by local deformation of the material of the race.

4. The method according to claim 1, wherein the retention means includes a rib that protrudes with respect to the face of the race and is embedded in the synthetic material of the wear race.

5. The method according to claim 4, wherein the rib protrudes radially with respect to the face of the race.

6. The method according to claim 1, wherein the retention means is provided on an external face of the race.

7. The method according to claim 1, wherein the face of the race also provides at least one blind indentation that extends from the retention means into which the synthetic material of the wear race passes.

8. The method according to claim 1, wherein the face of the race includes an annular groove, from the bottom of which the retention means extends into which the synthetic material of the wear race passes.

\* \* \* \* \*